July 20, 1965  KIYOSHI INOUE  3,196,346
SHAFT SPEED INDICATOR EMPLOYING ROTATING BEARING MEMBERS
Filed Jan. 17, 1961
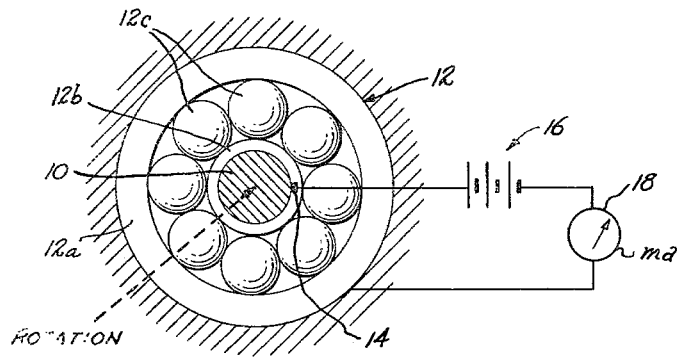
Fig. 1.
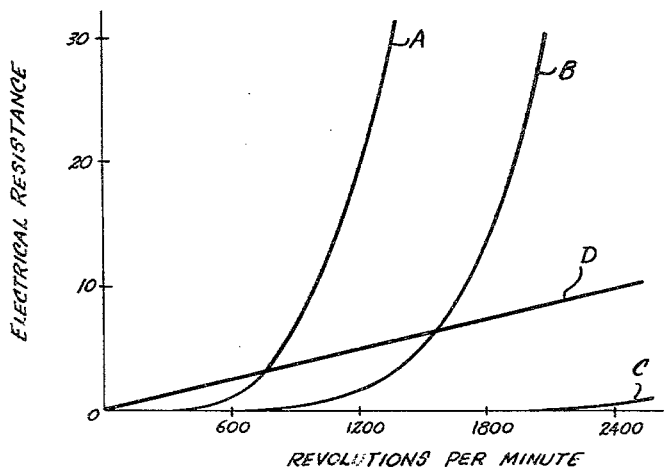
Fig. 2.
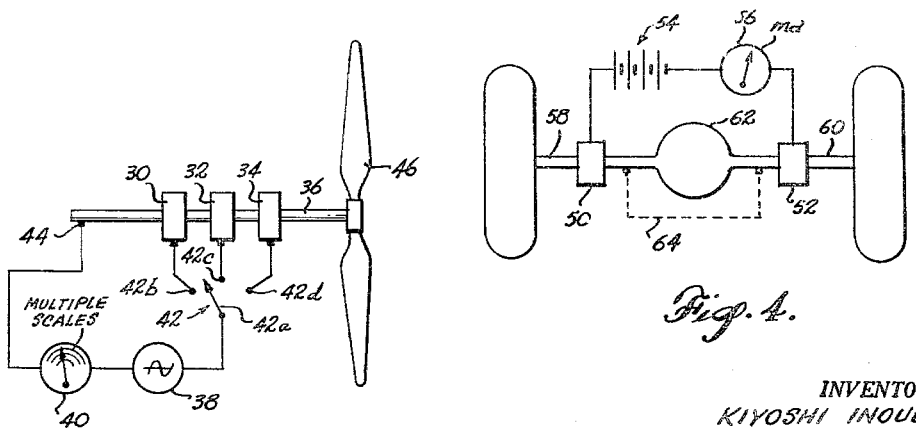
Fig. 3.
Fig. 4.
INVENTOR.
KIYOSHI INOUE
BY
Reynolds & Christensen
ATTORNEYS

United States Patent Office 3,196,346
Patented July 20, 1965

3,196,346
SHAFT SPEED INDICATOR EMPLOYING
ROTATING BEARING MEMBERS
Kiyoshi Inoue, 182 Yoga Tamagawa Setagaya-ku,
Tokyo, Japan
Filed Jan. 17, 1961, Ser. No. 83,314
2 Claims. (Cl. 324—70)

This invention relates to an apparatus for measuring shaft rotational speed or more generally the relative speed between two parallel surfaces. The invention is herein illustratively described by reference to its presently preferred embodiments; however, it will be recognized that it has various other applications and that certain modifications and changes therein with respect to details may be made without departing from the underlying essentials thereof.

There are, of course, available a number of different types of devices for measuring shaft speed. However, most require special sensing mechanisms of a mechanical or electrical nature mounted upon or connected rotatively to the shaft and which, except for the requirements of the speed measurement function, would otherwise constitute no part of the machine or apparatus incorporating such shaft. A broad object of the present invention is to provide a shaft speed measuring device which utilizes as its sensing element a common component or element such as is normally already present in most machines or devices having rotary shafts. Specifically the invention contemplates measuring shaft speed by utilizing a common ball bearing or the like as the sensing or detecting element responsive to speed.

Additional objects and advantages include: providing the desired result with inexpensive, rugged, durable, vibration and shock-resistant, and conveniently available sensing or detecting means mounted in or upon the machine or device, and more specifically a device which rotatively supports or engages the shaft to be measured for speed.

Another object is such a device in which wear of the sensing or detecting element is not a serious problem.

Still another object is a technique for measuring shaft speed which is versatile in its application to any of various kinds of machines or devices and in any of different operating environments.

Compactness, simplicity, avoidance of maintenance problems constitute additional advantages.

In accordance with this invention, it has been discovered that there is a unique relationship between the speed of a rotating shaft and the electrical resistance value measured between the races of a ball bearing or the like supporting the shaft or rotatively engaged by it. By passing electric current through the ball bearing, i.e., through the ball elements between the races, in an electric circuit incorporating a current measuring device, a direct measure of shaft speed is obtained. The current (i.e., resistance) measuring device may constitute a simple galvanometer or any other means responsive to current flow. Alternative methods of measuring resistance of the ball bearing element may also be used and it is unimportant whether the applied voltage be direct voltage or alternating voltage.

In one application of the invention as herein described, the speed of a moving vehicle is measured by measuring the average of the resistances of the two bearings supporting the wheel shafts on opposite sides of the differential. In still another illustrative embodiment, variations of shaft speed are measured over a wide range by mounting the shaft in a plurality of bearings each having different materials therein producing respectively different speed responsive resistance characteristics, each sensitive in a different portion of the speed range from that of the others, and a selector switch by which a single meter may be utilized to indicate shaft speed in the different portions of the range. In that event the meter has a plurality of calibration scales corresponding to the different switch positions. Alternatively, separate meters each connected with a different ball bearing unit may be used.

These and other features, objects and advantages of the invention will become more fully evident from the following description thereof by reference to the accompanying drawings.

FIGURE 1 is a simplified and partially schematic diagram in which a shaft is shown in cross section supported in a typical ball bearing and is connected in an electrical circuit for measuring shaft speed.

FIGURE 2 is a graph illustrating the resistance characteristics of bearings having different lubricants.

FIGURE 3 is a simplified schematic diagram of a shaft speed indicator applied to a wind velocity meter, incorporating a plurality of bearings having different resistance versus speed characteristics.

FIGURE 4 is a schematic diagram showing application of the invention to measuring vehicle speed.

In FIGURE 1 the shaft 10 is shown mounted in conventional manner within the ball bearing 12 which comprises a fixed outer race 12a, an inner race 12b surrounding the shaft, and a plurality of spherical bearing balls 12c held in rolling contact with and between the races. By suitable means such as an electric brush 14, one side of a source of voltage 16 is connected electrically to the shaft, whereas the opposite side of the source is connected to the stationary outer race 12a to form an electric circuit in which a galvanometer 18 is incorporated. Alternatively, the brush 14 may be connected to the inner race 12b. In any event, the metering circuit is connected to measure variations in the electrical resistance which occur between the races of a ball bearing as a function of shaft speed and which have been determined to be a reasonably accurate indication of changes of speed. The galvanometer 18, which may comprise a simple milliammeter, may then be calibrated in units of speed in order to provide a direct measurement of shaft speed.

In FIGURE 2 the resistance characteristics of bearings under different conditions are plotted as a function of speed in a representative case. For example, the characteristic or line D in this graph, which is a substantially straight line rising linearly as a function of speed, represents the resistance characteristic of a common, ordinary ball bearing using steel balls and any conventional bearing metal race, without lubrication. When different lubricants are employed, however, the characteristic is substantially modified. For example, the characteristic A represents the resistance variation of a similar bearing when a common form of axle grease is used as the lubricant. In this case, it will be noted that in the lower speed range there is no material increase of resistance with increase of speed until speed reaches a value of the order of a few hundred revolutions per minute. At this point the resistance suddenly starts to increase and does so progressively more rapidly as speed further increases, following an approximately exponential curve. The resistance increase in this case rises rapidly to a very high value. On the other hand, the characteristic curve B represents the effect on the same bearing of a common spindle (i.e., low-viscosity) oil as the lubricant in the bearing. In this case, the characteristic curve is somewhat similar to the curve A in its configuration; however, the resistance value remains substantially at zero until the shaft speed rises to a value in excess of 600 or 700 revolutions per minute, whereupon the resistance value rises rapidly in an approximately exponential function with further increase of speed. The curve C represents the same bearing using molybdenum bisulfide as a lubricant and shows an even higher break point in terms of shaft speed.

It is found that as long as the lubricant remains substantially the same, the resistance characteristic of a bearing remains substantially constant so that measurements obtained are reasonably accurate and are the same on repeated cycles of speed change.

In FIGURE 3 a plurality of bearings 30, 32 and 34, having fixed outer races and having inner races mounted upon the common shaft 36, are designed to operate in different lubricants or with different bearing materials so as to present a succession of different resistance-speed characteristics, such as the characteristics A, B and C in FIGURE 2. An alternating voltage source 38 and a galvanometer 40 or other current measuring instrument are serially connected with the movable contactor 42a of the selector switch 42 and the brush 44 which contacts the shaft 36. The selector switch 42 has three stationary contacts 42b, 42c and 42d respectively connected to the outer races of bearings 30, 32 and 34, so that, depending upon the position of contact arm 42a, the electrical resistance of either of the three bearings is measured by the galvanometer 40. A propeller 46 is mounted on the end of the shaft in this instance to provide a device for measuring wind velocity. By moving the selector contact 42a into its different positions as the meter indicator element reaches one end or the other of its range of movement, the total range of the instrument may be extended through use of a plurality of different calibration scales on the meter corresponding to the different resistance variations of the individual bearings as a function of changing speed. That is, the total speed range is divided into successive sections within each of which a different one of the bearing elements is particularly suited to sense shaft speed, and for which the meter has a calibration scale. Not only may this result be achieved by using similar bearings with different lubricants but, in some instances, by use of different bearing materials proper.

In the embodiment shown in FIGURE 4, the speed of an automobile is measured by connecting the axle bearings 50 and 52 serially in an electric circuit including the power source 54 and the galvanometer 56, relying upon the axles 58 and 60 and the differential mechanism 62 to complete the electric circuit between the bearings. Alternatively, a jumper conductor 64 may be connected directly between the axles, by-passing the differential in order to prevent any electrical resistance of the differential unit from affecting the readings. In this case, the meter 56 reads the sum of the electrical resistances of bearings 50 and 52. Since, at times, the wheels will be turning at different speeds, the true speed will be represented by a value proportional to the sum.

It will be recognized that the principle of operation of the invention is based on the electrical resistance characteristic of a ball bearing or roller bearing element moving and rolling between two surfaces. Consequently, in effect, the apparatus is really measuring the rate of movement of one surface relative to the other, so that the same principle applies regardless of whether the motion being measured is rotary motion of a shaft or linear motion of a machine part of round contour or of any other contour (i.e., flat, curved, etc.) relative to an opposing stationary surface or movable surface of similar contour or which maintains the ball bearing or roller bearing element in contact with the first surface. It will also be recognized, of course, that the number of ball bearing elements and the materials used in the ball bearings will determine the actual resistance value used. However, in any given installation it is a comparatively simple matter to calibrate the meter on the basis of resistance readings obtained as a function of speed and to transpose or convert those readings or a calibration scale into direct indications of speed.

These and other aspects of the invention will be evident to those skilled in the art on the basis of the above description of the presently preferred practices of the invention.

I claim as my invention:

1. Means to measure shaft speed over a predetermined range, including a plurality of bearings having round bearing elements therein, said bearings respectively incorporating different materials therein so that their electrical resistances vary most rapidly as a function of shaft speed in respectively different portions of said range, and electric-circuit means operable to measure the electric-resistance variations of one such bearing in one portion of the range and the electric resistance variations of another such bearing in a different portion of the range.

2. Means to measure speed of a vehicle having a differential drive mechanism, wheels supported on first and second axles respectively connected to opposite sides of said differential, and first and second bearings for said first and second axles, respectively, including vehicle-mounted outer races, axle-mounted inner races and round bearing elements interposed between the races to thereby rotatively support the respective axles on the vehicles, said means comprising a voltage source, an electrical connection from one side of said source to a race of said first bearing, an electrical connection from the opposite side of said source to a race of said second bearing, an electrical connection between the other races of the respective bearings, and indicator means interposed in one of the connections for responding to electric current therein.

References Cited by the Examiner

UNITED STATES PATENTS

| 1,989,627 | 1/35 | Sage | 324—65 |
| 2,337,414 | 12/43 | Rieber | 324—65 |
| 2,808,563 | 10/57 | Hornbostel | 324—65 |
| 2,952,807 | 9/60 | Heller | 324—70 |
| 3,024,414 | 3/62 | Nordqvist | 324—70 |

OTHER REFERENCES

"Electrical Properties of Some Carbon Black Suspensions," Journal of Applied Physics, June 1951, pages 705–710.

WALTER L. CARLSON, *Primary Examiner.*

SAMUEL BERNSTEIN, FREDERICK M. STRADER,
*Examiners.*